A. L. FOREMAN.
SEALING DEVICE.
APPLICATION FILED MAY 25, 1912.
1,124,005.
Patented Jan. 5, 1915.
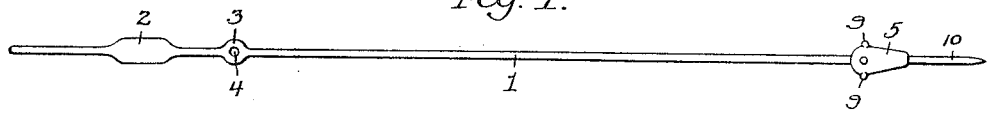
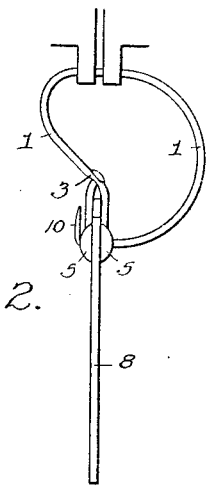
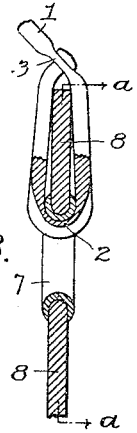
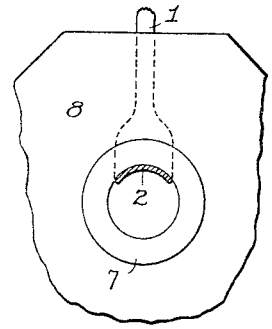
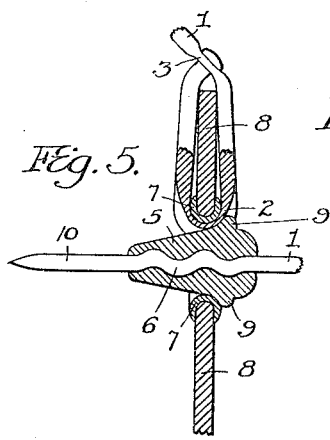
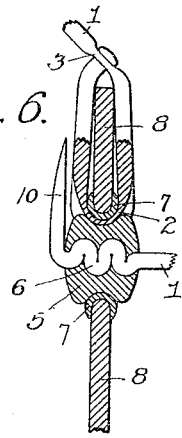
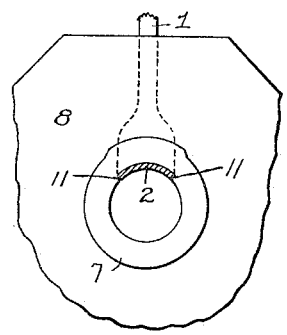
WITNESSES
Hamilton S. Turner
Elsie Fullerton
INVENTOR
AMOS L. FOREMAN
BY HIS ATTORNEY
Harry Smith

UNITED STATES PATENT OFFICE.

AMOS L. FOREMAN, OF BALTIMORE, MARYLAND.

SEALING DEVICE.

1,124,005.    Specification of Letters Patent.    Patented Jan. 5, 1915.

Application filed May 25, 1912. Serial No. 699,822.

*To all whom it may concern:*

Be it known that I, AMOS L. FOREMAN, a citizen of the United States, residing in Baltimore, Maryland, have invented certain Improvements in Sealing Devices, of which the following is a specification.

My invention relates to that class of sealing devices which are provided with an eyelet to be engaged by the sealing member, the objects of my invention being to prevent, or to reduce to a minimum, obstruction by the sealing wire of the opening in the eyelet intended for the reception of the sealing member, to increase the hold of said sealing member upon the sealing wire, and to provide means for securely locking to the eyelet the end of the sealing wire opposite to that which carries the sealing member. These objects I attain in the manner hereinafter set forth, reference being had to the accompanying drawing, in which—

Figure 1 is a view of a sealing device prepared in accordance with my invention; Fig. 2 is a view illustrating the manner in which said sealing device is employed; Fig. 3 is a sectional view showing the means for attaching one end of the sealing wire to the eyeleted member; Fig. 4 is a view partly in side elevation and partly in section on the line *a—a*, Fig. 3; Fig. 5 is a view similar to Fig. 3, but with the sealing member in position for completing the seal; Fig. 6 is a similar view showing the seal completed, and Fig. 7 is a view similar to Fig. 4, but illustrating a special embodiment of my invention. Figs. 3 to 7 inclusive are on a larger scale than Figs. 1 and 2.

As shown in Fig. 1, the sealing wire 1 has, near one end, two flattened portions 2 and 3, the latter being centrally perforated as at 4, and adjacent to the other end of the wire is the sealing member 5, the latter being composed of relatively soft and ductile metal cast around a portion of the wire which is waved, serrated, roughened, indented, or otherwise formed, as shown at 6, so as to insure a proper hold of the sealing member thereon in order to prevent said sealing member from being withdrawn longitudinally from the wire. The eyelet 7 which constitutes a member of the sealing device may be attached to a tag, check, or marker 8, of any desired character, or may even be used alone, if desired.

On the exterior of the sealing member 5 are formed suitable lugs 9 or a flange or other projecting body, which will limit the extent to which the sealing member can be projected through the eyelet. On applying the sealing wire to the eyelet one end of the wire is passed through said eyelet until the flattened portion 2 of the wire occupies a position within the eyelet, as shown in Fig. 3, whereupon the end of the wire is passed through the opening 4 in the flattened portion 3 of the wire and then riveted down upon said flattened portion so as to form a permanent loop, as shown in Fig. 3. If, however, such permanent loop is not desired, the end of the wire may be twisted around the standing portion of the same, the flattened and perforated portion 3 of the wire being dispensed with.

Besides being flattened the portion 2 of the wire may be concaved to accord with the curve of the eyelet opening, or such conformation of the flattened portion 2 of the wire at the eyelet may be effected by the pressure of the sealing member upon said flattened portion of the wire when said sealing member is forced into the eyelet, as shown in Fig. 5.

The sealing member is in the form of a tapering cylinder so as to readily enter the eyelet but I also prefer to permit a portion of the sealing wire to project beyond the sealing member, as shown at 10, so as to serve as a means of guidance if the eyelet is very small in diameter, or if the object to be sealed is located in a dark corner or other place where the light is defective.

The confining of the sealing member to the eyelet is effected, as shown in Fig. 6, by the upsetting or displacement of the metal of which said sealing member is composed under the pressure of the sealing tongs, pliers, or other implement, such compression of the sealing member also squeezing together the waved portion of the wire on which the sealing member is cast.

Not only does the flattening of the wire reduce to a minimum the obstruction of the eyelet opening and thereby permit such a full introduction of the sealing member 5 as will cause the latter to project properly on each side of the eyelet but it also insures an effective hold of the sealing member upon the wire when the sealing has been effected, as shown in Fig. 6, and prevents the pulling of said wire out of the seal which might be done if the wire was of uniform cross section throughout.

In some cases I prefer to deflect the eyelet at the top, as shown at 11 in Fig. 7, so as to provide a recess for the reception of the flattened portion 2 of the sealing wire, in which case the entire diameter of the normal opening of the eyelet is available for the reception of the sealing member 5.

When the tag or marker is of metal or other material which does not have to be strengthened for the reception of the seal the eyelet may be dispensed with, a simple opening being formed in the tag or marker for the reception of the sealing member, this opening thus serving the same purpose as the eyelet and being considered the equivalent thereof.

I claim:

1. The within described sealing device, the same consisting of an eyelet and a wire passing through the object to be sealed and having formed in it at one end a permanent loop, the other end of the wire having permanently secured thereto a sealing member, that portion of the wire which forms the loop passing through the eyelet so that the latter engages the bight of the loop whereby, when the sealing member has been passed part way through the eyelet and then compressed so as to engage the same, both the looped end of the wire and the end carrying the sealing member will be permanently secured to the eyelet by said sealing member.

2. A sealing device consisting of an eyelet having an offset therein, and a sealing wire having at one end a permanent loop engaging the eyelet and seated in the offset portion of the same, and at the other end a sealing member which can be passed part way through the eyelet and then compressed so as to fill said eyelet.

In testimony whereof, I have signed my name to this specification, in the presence of two subscribing witnesses.

AMOS L. FOREMAN.

Witnesses:
KATE A. BEADLE,
HAMILTON D. TURNER.

Copies of this patent may be obtained for five cents each, by addressing the "Commissioner of Patents. Washington, D. C."